United States Patent
Park et al.

(10) Patent No.: US 12,099,210 B2
(45) Date of Patent: *Sep. 24, 2024

(54) LENS DRIVING DEVICE, CAMERA MODULE, AND OPTICAL APPARATUS

(71) Applicant: LG Innotek Co., Ltd., Seoul (KR)

(72) Inventors: Tae Bong Park, Seoul (KR); Jin Suk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,195

(22) Filed: Oct. 28, 2022

(65) Prior Publication Data

US 2023/0053391 A1 Feb. 23, 2023

Related U.S. Application Data

(63) Continuation of application No. 16/939,782, filed on Jul. 27, 2020, now Pat. No. 11,543,672, which is a
(Continued)

(30) Foreign Application Priority Data

Jan. 7, 2016 (KR) ........................ 10-2016-0002017
Jan. 7, 2016 (KR) ........................ 10-2016-0002020

(51) Int. Cl.
*G02B 7/02* (2021.01)
*G02B 7/00* (2021.01)
(Continued)

(52) U.S. Cl.
CPC ............. *G02B 27/646* (2013.01); *G02B 7/08* (2013.01); *G03B 3/10* (2013.01); *G03B 5/00* (2013.01);
(Continued)

(58) Field of Classification Search
CPC ........ G02B 7/102; G02B 15/173; G02B 7/10; G02B 7/021; G02B 7/04; G02B 7/08; G03B 3/10; G03B 17/14; G11B 7/0932
(Continued)

(56) References Cited

U.S. PATENT DOCUMENTS 9,151,963 B2 10/2015 Sato et al.
2011/0103782 A1 5/2011 Tsuruta et al.
(Continued)

FOREIGN PATENT DOCUMENTS

CN 201732198 U 2/2011
CN 102016709 A 4/2011
(Continued)

*Primary Examiner* — Dawayne Pinkney
(74) *Attorney, Agent, or Firm* — Birch, Stewart, Kolasch & Birch, LLP

(57) ABSTRACT

The present embodiment relates to a lens driving device including: a housing; a bobbin disposed inside the housing so as to move in a first direction; a first coil disposed on the outer circumferential surface of the bobbin; a magnet disposed in the housing; a base disposed below the housing; a coil part having a second coil disposed between the housing and the base so as to face the magnet; a substrate disposed between the housing and the base; and a conducting member for electrically connecting the coil part to the substrate, wherein the conducting member is disposed at a corner of the base.

20 Claims, 6 Drawing Sheets

Related U.S. Application Data continuation of application No. 16/068,608, filed as application No. PCT/KR2017/000190 on Jan. 6, 2017, now Pat. No. 10,768,437.

(51) Int. Cl.
| | | |
|---|---|---|
| G02B 7/08 | (2021.01) | |
| G02B 27/64 | (2006.01) | |
| G03B 3/10 | (2021.01) | |
| G03B 5/00 | (2021.01) | |
| H02K 41/035 | (2006.01) | |
| H04N 23/55 | (2023.01) | |
| H04N 23/68 | (2023.01) | |

(52) U.S. Cl.
CPC ......... *H02K 41/0356* (2013.01); *H04N 23/55* (2023.01); *G03B 2205/0007* (2013.01); *G03B 2205/0069* (2013.01); *H02K 41/0354* (2013.01); *H04N 23/687* (2023.01)

(58) Field of Classification Search
USPC ............... 359/811–830, 642, 696, 694, 676, 359/699–701
See application file for complete search history.

(56) References Cited

U.S. PATENT DOCUMENTS

| | | | | |
|---|---|---|---|---|
| 2012/0013202 | A1 | 1/2012 | Lee | |
| 2012/0200176 | A1 | 8/2012 | Park | |
| 2012/0307088 | A1* | 12/2012 | Han | H04N 23/50 348/208.11 |
| 2012/0314307 | A1 | 12/2012 | Ikushima et al. | |
| 2014/0072289 | A1* | 3/2014 | Lim | G03B 3/10 396/55 |
| 2014/0355120 | A1 | 12/2014 | Yeo | |
| 2015/0103195 | A1 | 4/2015 | Kwon et al. | |
| 2015/0168668 | A1 | 6/2015 | Wu et al. | |
| 2015/0177479 | A1* | 6/2015 | Lee | G03B 3/10 359/824 |
| 2015/0253583 | A1* | 9/2015 | Cho | G02B 13/0015 359/557 |
| 2016/0373000 | A1 | 12/2016 | Park | |

FOREIGN PATENT DOCUMENTS

| | | |
|---|---|---|
| CN | 102629815 A | 8/2012 |
| CN | 203502646 U | 3/2014 |
| CN | 203849489 U | 9/2014 |
| CN | 104216199 A | 12/2014 |
| CN | 104716458 A | 6/2015 |
| CN | 104902149 A | 9/2015 |
| CN | 104935792 A | 9/2015 |
| CN | 204886643 U | 12/2015 |
| CN | 204903925 U | 12/2015 |
| JP | 2013-44924 A | 3/2013 |
| JP | 2013-156438 A | 8/2013 |
| JP | 2015-114670 A | 6/2015 |
| KR | 10-2014-0140329 A | 12/2014 |
| KR | 10-2015-0009685 A | 1/2015 |
| KR | 10-2015-0042681 A | 4/2015 |
| KR | 10-2015-0101676 A | 9/2015 |
| KR | 10-2015-0103892 A | 9/2015 |
| KR | 10-2015-0140995 A | 12/2015 |
| KR | 10-2015-0142421 A | 12/2015 |
| KR | 10-2016-0000728 A | 1/2016 |
| WO | WO 2015/130051 A1 | 9/2015 |

* cited by examiner

LENS DRIVING DEVICE, CAMERA MODULE, AND OPTICAL APPARATUS

CROSS REFERENCE TO RELATED APPLICATIONS

This application is a continuation of U.S. application Ser. No. 16/939,782, filed Jul. 27, 2020, which is a continuation of U.S. application Ser. No. 16/068,608, filed Jul. 6, 2018, now U.S. Pat. No. 10,768,437, issued on Sep. 8, 2020, which is the National Phase of PCT International Application No. PCT/KR2017/000190, filed on Jan. 6, 2017, which claims priority under 35 U.S.C. 119(a) to Patent Application Nos. 10-2016-0002017, filed in the Republic of Korea on Jan. 7, 2016 and 10-2016-0002020, filed in the Republic of Korea on Jan. 7, 2016, all of which are hereby expressly incorporated by reference into the present application.

TECHNICAL FIELD

The teachings in accordance with exemplary and non-limiting embodiments of this invention relate generally to a lens driving device, a camera module, and an optical apparatus.

BACKGROUND ART

This section provides background information related to the present disclosure, which is not necessarily prior art.

Concomitant with widely generalized dissemination of various mobile terminals and commercialization of wireless Internet services, demands by consumers related to mobile terminals are diversified to prompt various types of circumferential devices or additional equipment to be mounted on mobile terminals.

Inter alia, camera modules may be representative items photographing an object in a still picture or a video. Recently, camera modules equipped with handshake correction (OIS: Optical Image Stabilization) function have been developed. Meantime, the camera modules equipped with the OIS function generally require an OIS coil and an electric conductive structure for substrate that provides a power to the coil.

On the other hand, the conventional camera modules having the OIS function suffers from disadvantages in that short-circuit may be generated between an OIS coil and other members due to solder balls that electrically conducts a substrate, there may be generated a tilt when the coil and the substrate are fixed, and there may be generated a limitation in contact area between an OIS spring and a base.

In addition, there may be generated a limitation design-wise in spatial area for a substrate, because recently, resolution of a camera module has grown larger and an external size of a camera module has grown smaller. Meantime, a camera module having the abovementioned OIS function requires an OIS spring movably supporting a mover relative to a stator.

The camera module equipped with an OIS function according to prior art suffers from a design-wise spatial limitation in a leg of an OIS spring. Furthermore, a short-circuit, which pops up in the soldering process between a power-supplying substrate and an OIS spring, may be generated, or a foreign object may be infiltrated. Still furthermore, another problem may be generated where a contact area between an OIS spring and a base disposed with a stator is limited.

DETAILED DESCRIPTION OF THE INVENTION

Technical Subject

In order to solve the abovementioned problems/disadvantages, exemplary embodiments of the present invention provide a lens driving device reflected with an optimal design to an electrically conductive structure between an OIS coil and a substrate supplying a power to the coil.

In order to solve the abovementioned problems/disadvantages, exemplary embodiments of the present invention provide a lens driving device reflected with an optimal design to an arrangement structure between an OIS spring, a substrate of stator and a base disposed with the substrate.

Exemplary embodiments of the present invention are to provide a camera module including the lens driving device and an optical apparatus.

Technical Solution

In one general aspect of the present invention, there is provided a lens driving device comprising: a housing; a bobbin disposed inside the housing so as to move in a first direction; a first coil disposed on the outer circumferential surface of the bobbin; a magnet disposed in the housing; a base disposed below the housing; a coil part having a second coil disposed between the housing and the base so as to face the magnet; a substrate disposed between the housing and the base; and a conducting member for electrically connecting the coil part to the substrate, wherein the conducting member is disposed at a corner of the base.

Preferably, but not necessarily, a corner part of the base may be formed between a first lateral surface and a second lateral surface of base, and a distance between the conducting member and the first lateral surface may correspond to a distance between the conducting member and the second lateral surface.

Preferably, but not necessarily, the corner part of the base may be formed with an extension part extended from an upper surface of base to an upper side of the base, wherein the conducting member may be disposed at an inside of the extension part.

Preferably, but not necessarily, the coil part may include a first coil unit directly connected to the conducting member, a second coil unit spaced apart from the first coil unit and a connecting coil unit directly connecting the first coil unit and the second coil unit.

Preferably, but not necessarily, a vertical distance between the magnet and the coil part may be 80~120 μm.

Preferably, but not necessarily, the conducting member may be disposed between two adjacent lateral surfaces of the coil part, and the conducting member may be spaced apart at a same distance with each of the two adjacent lateral surfaces.

Preferably, but not necessarily, the base may include first to fourth lateral surfaces and a first to fourth corner parts disposed among the first to fourth lateral surfaces, and the conducting member may include a first conducting part disposed at the first corner part, a second conducting part disposed at the second corner part, a third conducting part disposed at the third corner part and a fourth conducting part disposed at the fourth corner part.

Preferably, but not necessarily, the second coil may include a first coil unit directly connected to the first conducting part, a second coil unit directly connected to the third conducting part, a third coil unit directly connected to the second conducting part, a fourth coil unit directly connected to the fourth conducting part, a first connecting coil unit directly connecting the first coil unit and the second coil unit, and a second connecting coil unit directly connecting the third coil unit and the fourth coil unit.

Preferably, but not necessarily, the coil part and the substrate may be electrically connected only by the first to fourth conducting parts.

Preferably, but not necessarily, a lateral part of the base may not be disposed with a conducting member electrically connecting the coil part and the substrate.

Preferably, but not necessarily, the base may further include a support member movably supporting the housing, wherein the support member may include a first lateral support unit disposed at a first lateral surface of base to be electrically connected to the substrate through a fifth conducing part, and a second lateral support unit disposed at a second lateral surface of base to be electrically connected to the substrate through a sixth conducting part, and a distance between the first conducting part and the fifth conducting part may correspond to a distance between the first conducting part and the sixth conducting part.

Preferably, but not necessarily, the lens driving device may further comprise an upper elastic member disposed at an upper side of bobbin to be coupled to the bobbin and the housing, wherein the upper elastic member may include a first upper elastic unit electrically connected to one end of the first coil, and a second upper elastic unit spaced apart from the first upper elastic unit to be electrically connected to the other end of the first coil.

Preferably, but not necessarily, the lens driving device may further comprise a plurality of leaf springs connected to the housing and the base, wherein the plurality of leaf springs may include a first lateral support unit electrically connecting the first upper elastic unit and the substrate, and a second lateral support unit spaced apart from the first lateral support unit to electrically connecting the second upper elastic unit and the substrate.

Preferably, but not necessarily, a lower surface of upper elastic member and a lateral surface of leaf spring may be coupled by soldering.

In another general aspect of the present invention, there is provided a camera module, comprising: a base; a housing disposed at an upper side of the base; a magnet disposed at the housing; a coil part interposed between the base and the housing to face the magnet; a support member movably supporting the housing relative to the base; a substrate interposed between the base and the housing; and a conducting member electrically connecting the coil part and the substrate, wherein the conducting member may be disposed at a corner part of base.

Preferably, but not necessarily, the corner part of base may be formed between a first lateral surface and a second lateral surface of base, and a distance between the conducting member and the first lateral surface may correspond to a distance between the conducting member and the second lateral surface.

Preferably, but not necessarily, the corner part of base may be formed with an extension part upwardly extended from an upper surface of base, and the conducting member may be disposed at an inside of the extension part.

Preferably, but not necessarily, the lens driving device may further comprise: a bobbin disposed at an inside of the housing; an AF coil disposed at the bobbin to face the magnet; and an upper elastic member coupled to the bobbin and the housing.

In still another general aspect of the present invention, there is provided a camera module, comprising: a PCB (Printed Circuit Board); an image sensor disposed at the PCB; a housing; a bobbin so disposed at an inside of the housing as to move to a first direction; a first coil disposed at an outer circumferential surface of bobbin; a magnet disposed at the housing; a base interposed between the housing and the PCB; a coil part having a second coil disposed between the housing and the base to face the magnet; a substrate disposed between the housing and the base; and a conducting member electrically connecting the coil part and the substrate, wherein the conducting member may be disposed at a corner part of base.

In still further general aspect of the present invention, there is provided an optical apparatus, comprising: a main body; a camera module disposed at the main body to photograph an image of a subject; and a display part disposed at one surface of main body to output the image photographed by the camera module, wherein the camera module may include: a PCB (Printed Circuit Board); an image sensor disposed at the PCB; a housing; a bobbin so disposed at an inside of the housing as to move to a first direction; a first coil disposed at an outer circumferential surface of bobbin; a magnet disposed at the housing; a base interposed between the housing and the PCB; a coil part having a second coil disposed between the housing and the base to face the magnet; a substrate disposed between the housing and the base; and a conducting member electrically connecting the coil part and the substrate, wherein the conducting member may be disposed at a corner part of base.

A lens driving device according to an exemplary embodiment of the present invention may comprise: a base including the first lateral surface, a second lateral surface adjacent to the first lateral surface, and a first corner part interposed between the first lateral surface and the second lateral surface; a housing disposed at an upper side of the base; a magnet disposed at the housing; a coil part interposed between the base and the housing to face the magnet; a substrate interposed between the base and the housing; and a conducting member electrically connecting the coil part and the substrate; wherein the conducting part may include a first conducting part disposed at a position corresponding to the first corner part of the base.

The coil part may include a first coil unit directly connected to the first coil unit, a second coil unit spaced apart from the first coil unit, and a connecting coil unit directly connecting the first coil unit and the second coil unit.

Preferably, but not necessarily, a vertical distance between the magnet and the coil part may be 80~120 μm.

The first conducting part may be disposed at the substrate of a position corresponding to the first corner part of base or an outer circumferential surface of the first coil part.

The base may further include a third lateral surface adjacent to the second lateral surface, a fourth lateral surface adjacent to the third lateral surface and the first lateral surface, a second corner part interposed between the second lateral surface and the third lateral surface, a third corner part interposed between the third lateral surface and the fourth lateral surface, and a fourth corner part interposed between the fourth lateral surface and the first lateral surface, wherein the conducting part may further include a second conducting part disposed at the second corner part, a third conducting part disposed at the third corner part, and a fourth conducting part disposed at the fourth corner part.

The coil part may include a first coil unit directly connected to the first conducting part, a second coil unit directly connected to the third conducting part, a third coil unit directly connected to the second conducting part, a fourth coil unit directly connected to the fourth conducting part, a first connecting coil unit directly connecting the first coil unit and the second coil unit, and a second connecting coil unit directly connecting the third coil unit and the fourth coil unit.

The coil part and the substrate may be electrically connected only by the first to fourth conducting parts.

A shape at a first lateral surface side of the coil part may correspond to that of a first lateral surface side of the substrate.

The lens driving device may comprise: a bobbin disposed at an inside of the housing; an AF coil part disposed at the bobbin to face the magnet; a first support member coupled to the bobbin and the housing to elastically support the housing; and a second support member coupled to the base and the housing to elastically support the base.

The second support member may include a first lateral support unit disposed at the first lateral surface to be electrically conducted through the substrate and a fifth conducting part, and a second lateral support unit disposed at the second lateral surface to be electrically conducted through the substrate and a sixth conducting part, wherein a distance between the first conducting part and the fifth conducting part may correspond to a distance between the first conducting part and the sixth conducting part.

The first support member may include an upper support member coupled to an upper surface of bobbin and to an upper surface of housing, and the upper support member may include a first upper support unit connected to one end of the second coil part and a second upper support unit spaced apart from the first upper support unit to be electrically connected to the other end of the second coil part, and the second support member may include a first lateral support unit electrically connecting the first upper support unit to the substrate, and a second lateral support unit spaced apart from the first lateral support unit to electrically connect the second upper support unit to the substrate.

A lower surface of the upper support member and an outer circumferential surface of the second support member may be coupled by soldering.

A camera module according to an exemplary embodiment of the present invention may comprise: a base including the first lateral surface, a second lateral surface adjacent to the first lateral surface, and a first corner part interposed between the first lateral surface and the second lateral surface; a housing disposed at an upper side of the base; a magnet disposed at the housing; a coil part interposed between the base and the housing to face the magnet; a substrate interposed between the base and the housing; and a conducting member electrically connecting the coil part and the substrate; wherein the conducting part may include a first conducting part disposed at a position corresponding to the first corner part of the base.

An optical apparatus according to an exemplary embodiment of the present invention may include: a base including the first lateral surface, a second lateral surface adjacent to the first lateral surface, and a first corner part interposed between the first lateral surface and the second lateral surface; a housing disposed at an upper side of the base; a magnet disposed at the housing; a coil part interposed between the base and the housing to face the magnet; a substrate interposed between the base and the housing; and a conducting member electrically connecting the coil part and the substrate; wherein the conducting part may include a first conducting part disposed at a position corresponding to the first corner part of the base.

A lens driving device according to an exemplary embodiment of the present invention may include: a base; a housing disposed at an upper side of the base; a first driving part disposed at the base; a second driving part disposed at the housing to face the first driving part; and a first support member coupled to the base and the housing, wherein the first support member may include: a lower coupling part coupled to the base; an upper coupling part coupled to the housing; a first connecting part connecting the lower coupling part to the upper coupling part, and a second connecting part connecting the lower coupling part to the upper coupling part, and spaced apart from the first connecting part, and wherein the lower coupling part may include a first lower part connected to the first connecting part, a second lower part connected to the second connecting part, and a third lower part directly connecting the first lower part to the second lower part, and wherein the third lower part may be overlapped with the base to a direction perpendicular to an optical axis direction.

The third lower part may be disposed on an imaginary plane that straightly connects the first lower part and the second lower part.

A length of the third lower part to an optical axis direction may be constant from a first lower part side to a second lower part side.

The lens driving device may further comprise: a first adherence part interposed between the first lower part and the base; a second adherence part interposed between the second lower part and the base; and a third adherence part interposed between the third lower part and the base.

The lens driving device may further comprise: a substrate disposed at least at one portion thereof between the base and the housing and electrically connected to the first driving part, and a conducting unit directly contacting the third lower part and the substrate.

The lens driving device may further comprise: a substrate disposed at least at one portion thereof between the base and the housing and electrically connected to the first driving part, and the third lower part may be disposed at a lower side than the substrate and the first driving part.

The lens driving device may further comprise: a substrate disposed at least at one portion thereof between the base and the housing and electrically connected to the first driving part, wherein the substrate may include a body part interposed between the base and the housing, and a terminal part bent and extended from the body part, and wherein the first connecting part may be connected to an outer distal end part of the first lower part and an outside of the outer distal end part of the first lower part may be disposed with the said terminal part.

The base may include a receptor groove recessed inwardly from an outer lateral surface and having a shape corresponding to that of at least one portion of the third lower part, wherein the receptor groove may accommodate at least one portion of the third lower part.

The lens driving device may further comprise: a bobbin disposed at an inside of the housing; a third driving part disposed at the bobbin to face the second driving part; and a second support member coupled to the bobbin and the housing to elastically support the bobbin relative to the housing.

The second support member may include a first upper support unit electrically connected to one end of the third driving part, and a second upper support unit spaced apart from the first upper support unit to be electrically connected to the other end of the third driving part, wherein the first support member may include a first lateral support unit electrically connecting the first upper support unit and the substrate, and a second lateral support unit spaced apart from the first lateral support unit to electrically connect the second upper support unit and the substrate.

The first lower part, the second lower part and the third lower part may be integrally formed.

A camera module according to an exemplary embodiment of the present invention may comprise: a base; a housing disposed at an upper side of the base; a first driving part disposed at the base; a second driving part disposed at the housing to face the first driving part; and a first support member coupled to the base and the housing, wherein the first support member may include: a lower coupling part coupled to the base; an upper coupling part coupled to the housing; a first connecting part connecting the lower coupling part to the upper coupling part; and a second connecting part connecting the lower coupling part to the upper coupling part and spaced apart from the first connecting part, and wherein the lower coupling part may include: a first lower part connected to the first connecting part; a second lower part connected to the second connecting part; and a third lower part directly connecting the first lower part and the second lower part, and wherein the third lower part may be overlapped with the base to a direction perpendicular to an optical axis direction.

An optical apparatus according to an exemplary embodiment of the present invention may comprise: a base; a housing disposed at an upper side of the base; a first driving part disposed at the base; a second driving part disposed at the housing to face the first driving part; and a first support member coupled to the base and the housing, wherein the first support member may include: a lower coupling part coupled to the base; an upper coupling part coupled to the housing; a first connecting part connecting the lower coupling part to the upper coupling part; and a second connecting part connecting the lower coupling part to the upper coupling part and spaced apart from the first connecting part, and wherein the lower coupling part may include: a first lower part connected to the first connecting part; a second lower part connected to the second connecting part; and a third lower part directly connecting the first lower part and the second lower part, and wherein the third lower part may be overlapped with the base to a direction perpendicular to an optical axis direction.

Advantageous Effects

The present exemplary embodiment can reduce a spatial restriction to design of a connecting part (leg) of an OIS spring.

Furthermore, a contact area between an OIS spring and ad base can be expanded to thereby improve the workability and reliability according to an exemplary embodiment of the present invention.

In addition, the present exemplary embodiment can prevent a solder ball penetration caused by soldering between a pad of a substrate and an OIS spring from being followed by short-circuit.

Furthermore, the number of solder balls for electrical conduction between an OIS spring and a substrate can be reduced to thereby reduce the tilt generated when the coil and the substrate are soldered.

Still furthermore, the present exemplary embodiment has an advantageous effect in that a pattern design spatial obtainment of a substrate can be made to be excellent even if a diameter of a through hole passed by a light having passed a lens becomes larger due to increased resolution and an external size of a camera module becomes decreased.

BEST MODE

Figure 1:
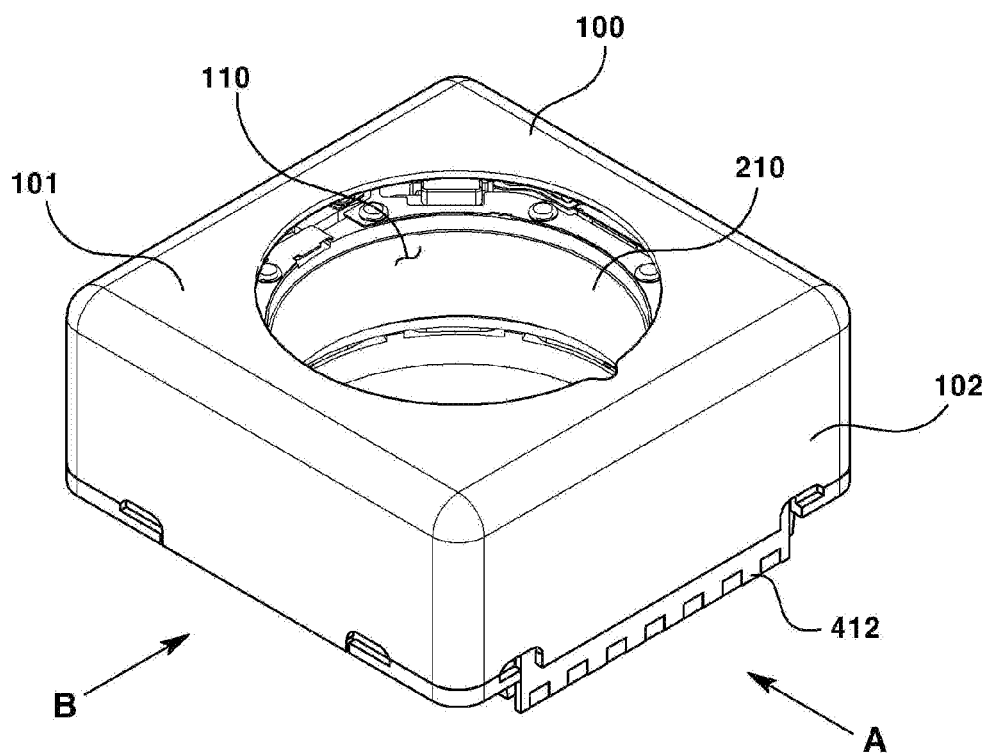
FIG. 1 is a perspective view illustrating a lens driving device according to an exemplary embodiment of the present invention.

Some of the exemplary embodiments of the present invention will be described with the accompanying drawings. Throughout the descriptions, the same reference numerals will be assigned to the same elements in the explanations of the figures. Accordingly, in some embodiments, well-known processes, well-known device structures and well-known techniques are not illustrated in detail to avoid unclear interpretation of the present disclosure Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

An "optical axis direction" as used hereinafter may be defined as an optical axis direction of a lens module in a state of being coupled to a lens driving device. Meantime, the "optical axis direction" may be interchangeably used with "vertical direction" and "z axis direction" and the like.

An "auto focus function" as used hereinafter may be defined as a function of automatically matching a focus relative to an object by adjusting a distance from an image sensor by moving a lens module to an optical axis direction. Meantime, the "auto focus" may be interchangeably used with "AF".

A "handshake correction function" as used hereinafter may be defined as a function of moving or tilting a lens module to a direction perpendicular to an optical axis direction in order to offset vibration (movement) generated on the image sensor by an outer force. Meantime, the "handshake correction" may be interchangeably used with an "OIS (Optical Image Stabilization)".

Now, a configuration of an optical apparatus according to an exemplary embodiment of the present invention will be described hereinafter.

The optical apparatus may be a hand phone, a mobile phone, a smart phone, a portable smart device, a digital camera, a notebook computer (laptop computer), a PMP (Portable Multimedia Player) and a navigation device. However, the present invention is not limited thereto, and may include any device capable of photographing an image or a photograph.

The optical apparatus may include a main body (not shown), a camera module and a display part (not shown). However, any one or more of the main body, the camera module and the display part may be omitted or changed.

The main body may form an exterior look of an optical apparatus. For example, the main body may include a look of a cubic shape. For another example, the main body may be formed in a round shape on at least some portions thereof. The main body may accommodate a camera module. The main body may be arranged at one surface with a display part. For example, the display part and the camera module may be disposed at one surface of the main body and a camera module may be additionally disposed at the other surface (surface opposite to the one surface) of main body.

The camera module may be disposed at the main body. The camera module may be disposed at one surface of the main body. At least some portions of the camera module may be accommodated into the main body. The camera module may be formed in a plural number. The plurality of camera modules may be respectively disposed at one surface of the main body and the other surface of the main body. The camera module may photograph an image of a subject.

The display part may be disposed at the main body. The display part may be disposed at one surface of main body. That is, the display part may be arranged on a same surface as that of the camera module. Alternatively, the display part may be disposed at the other surface of main body. The display part may be disposed at a surface on the main body opposite to a surface arranged with the camera module. The display part may output an image photographed by the camera module.

Now, configuration of camera module according to an exemplary embodiment of the present invention will be described.

The camera module may include a lens driving device, a lens module (not shown), an infrared cut-off filter (not shown), a PCB (Printed Circuit Board, not shown), an image sensor (not shown), and a controller (not shown). However, any one or more of the lens driving device, the lens module, the infrared cut-off filter, the PCB, the image sensor, and the controller may be omitted or changed from the camera module.

The lens module may include at least one or more lenses. The lens module may include a lens and a lens barrel. The lens module may include one or more lenses (not shown) and a lens barrel accommodating the lenses. However, one element of the lens module is not limited by the lens barrel, and any holder structure capable of supporting one or more lenses will suffice. The lens module may be coupled to an inside of the lens driving device. The lens module may be coupled to a bobbin (210) of lens driving device. The lens module may move integrally with the bobbin (210). The lens module may be coupled to the bobbin (210) using an adhesive (not shown). The lens module may be screw-coupled with the bobbin (210), for example. Meantime, a light having passed the lens module may be irradiated on an image sensor.

The infrared cut-off filter may serve to prevent a light of infrared ray region from entering an image sensor. The infrared cut-off filter may be interposed between a lens module and an image sensor, for example. The infrared cut-off filter may be disposed at a holder member (not shown) separately formed independent from a base (500). However, the infrared cut-off filter may be installed at a hollow hole (510) of the base (500). The infrared cut-off filter may be formed with a film material or a glass material. The infrared cut-off filter may be formed by allowing an infrared cut-off coating material to be coated on a plate-shaped optical filter such as an imaging plane protection cover glass or a cover glass, for example. The infrared cut-off filter may be an infrared absorption filter absorbing an infrared ray. For another example, the infrared cut-off filter may be an infrared reflection filter reflecting an infrared ray.

A lens driving device may be disposed at an upper surface of a PCB. The PCB may be disposed at a lower (lower) surface of the lens driving device. The PCB may be coupled with the lens driving device. The PCB may be mounted with an image sensor. The PCB may be electrically connected to the image sensor. A holder member may be interposed between the PCB and the lens driving device, for example. At this time, the holder member may accommodate an image sensor at an inside thereof. In another example, the lens driving device may be directly disposed at the PCB. At this time, an inside of the lens driving device may accommodate the image sensor. Through this configuration, a light having passed the lens module coupled to the lens driving device may be irradiated on the image sensor disposed at the PCB. The PCB may supply a power (current) to the lens driving device. Meantime, the PCB may be disposed with a controller for controlling the lens driving device.

The image sensor may be mounted on the PCB. The image sensor may be electrically connected to the PCB. For example, the image sensor may be coupled to the PCB using an SMT (Surface Mounting Technology). In another example, the image sensor may be coupled to the PCB using a flip chip technology. An optical axis of the image sensor may be so disposed as to match that of the lens module. That is, an optical axis of image sensor and an optical axis of lens module may be aligned, through which the image sensor can obtain a light having passed the lens module. The image sensor may convert the light irradiated to an effective image area of image sensor to an electrical signal. The image sensor may be any one of a CCD (charge coupled device), an MOS (metal oxide semi-conductor), a CPD and a CID, for example. However, the types of image sensor are not limited thereto, and any configuration capable of converting an incident light to an electrical signal may be permitted.

The controller may be mounted on a PCB. The controller may be disposed at an outside of the lens driving device. However, the controller may be also disposed at an inside of the lens driving device. The controller may individually control a direction, intensity and an amplitude of a current supplied to each element forming the lens driving device. The controller may perform any one of an AF function and an OIS function of the camera module by controlling the lens driving device. That is, the controller may move the lens module to an optical axis direction or tile the lens module to a direction orthogonal to the optical axis direction by controlling the lens driving device. Furthermore, the controller may perform any one or more of feedback controls in the AF function and OIS function. To be more specific, the controller may provide a more accurate auto focus function and OIS function by controlling a current or a power supplied to first driving part (220) to third driving part (420) by receiving a position of bobbin (210) or a housing (310) detected by a sensor part (not shown).

Figure 2:
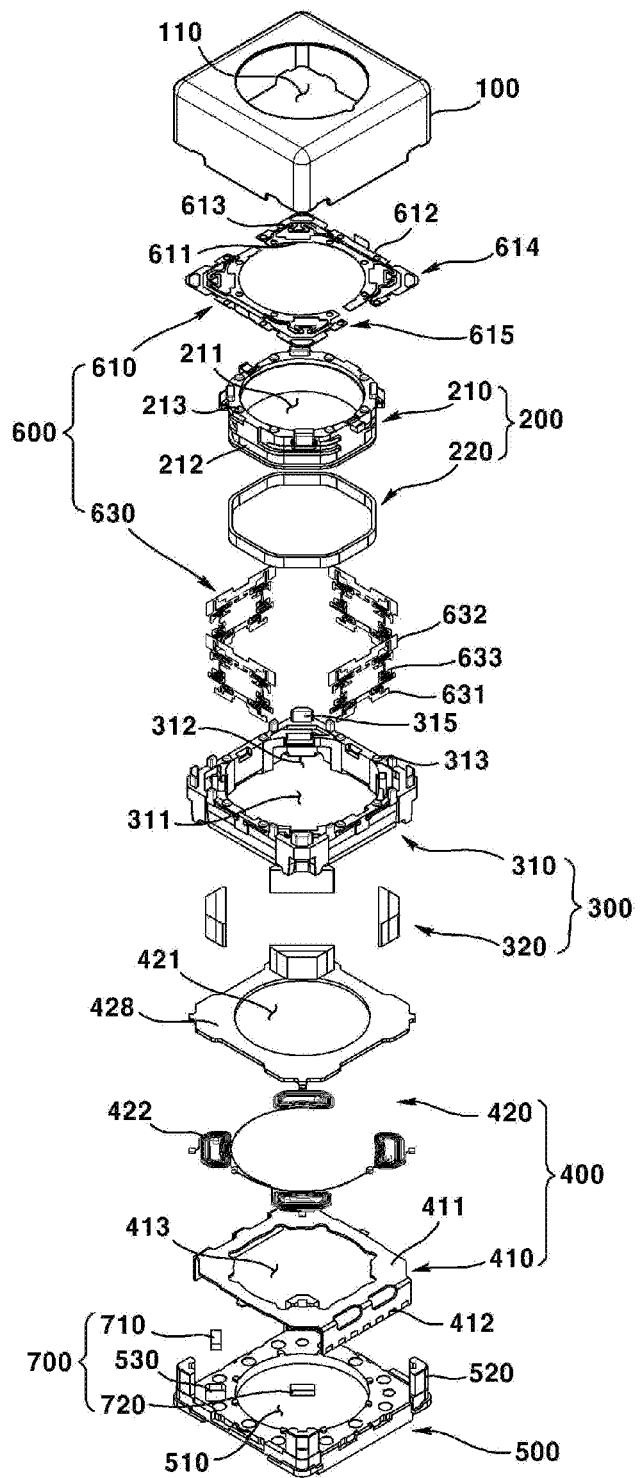
FIG. 2 is an exploded perspective view illustrating a lens driving device according to an embodiment of the present invention.
Figure 3:
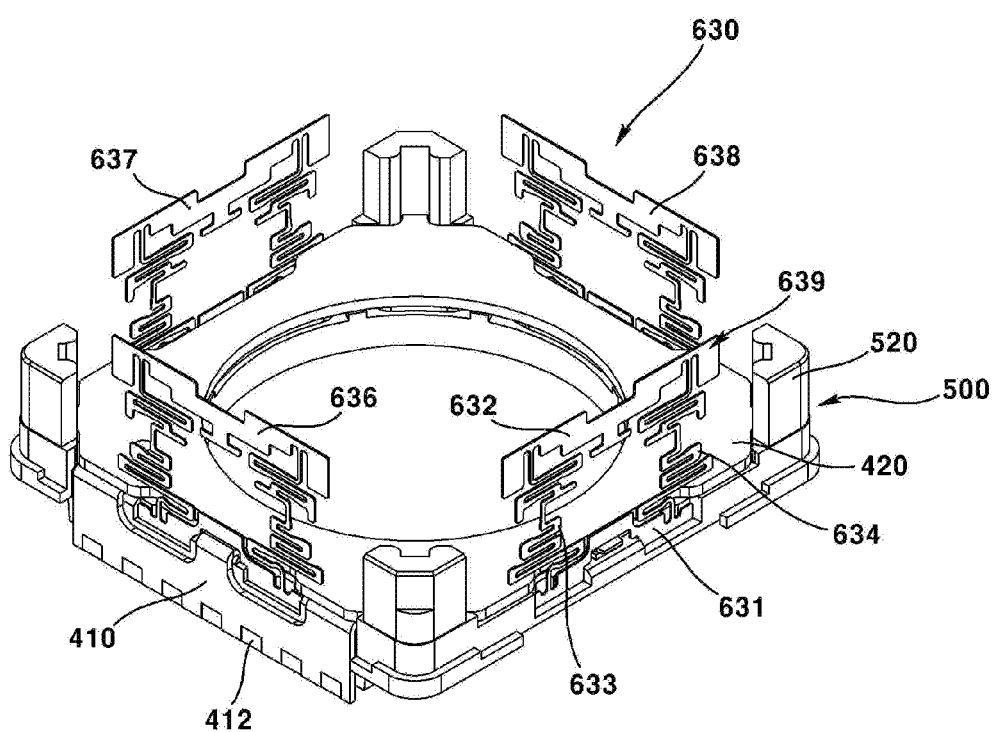
FIG. 3 is a perspective view illustrating some elements of a lens driving device according to an exemplary embodiment of the present invention.
Figure 4:
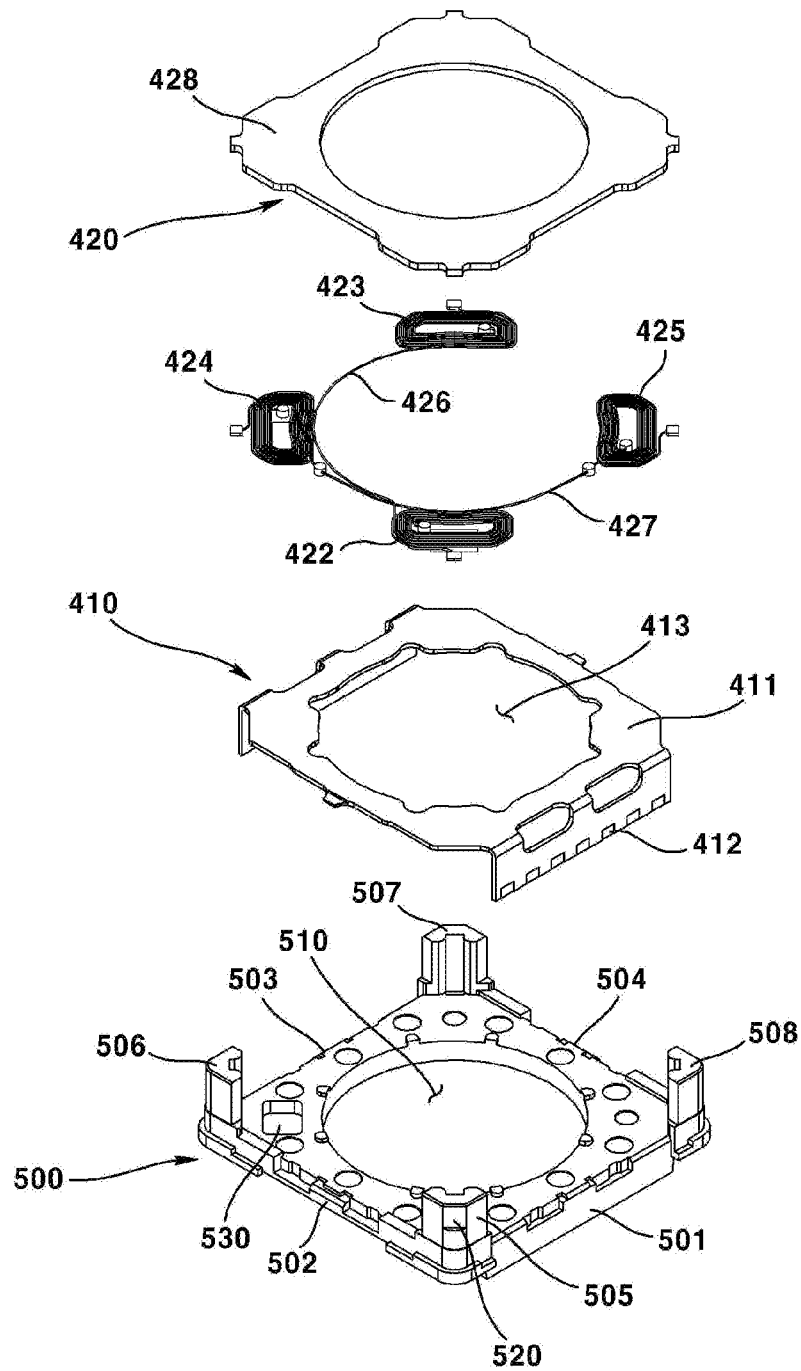
FIG. 4 is an exploded perspective view illustrating some elements of a lens driving device according to an exemplary embodiment of the present invention.
Figure 5:
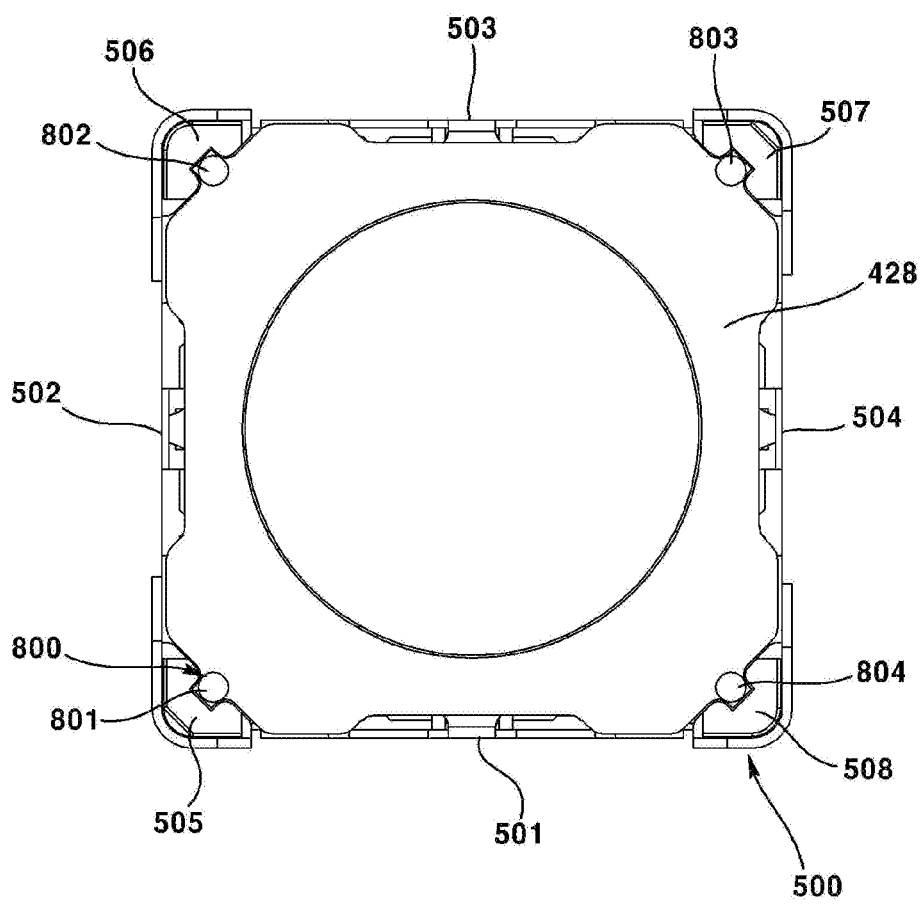
FIG. 5 is a plane view illustrating some elements of a lens driving device according to an exemplary embodiment of the present invention.
Figure 6:
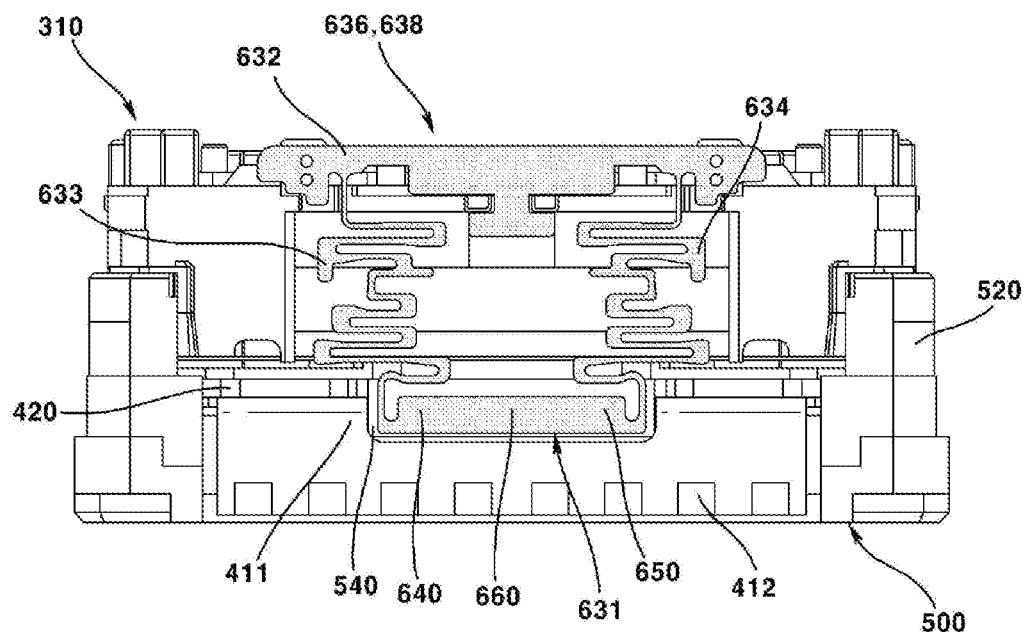
FIG. 6 is a lateral view illustrating some elements of a lens driving device viewed from a 'A' direction of FIG. 1.
Figure 7:
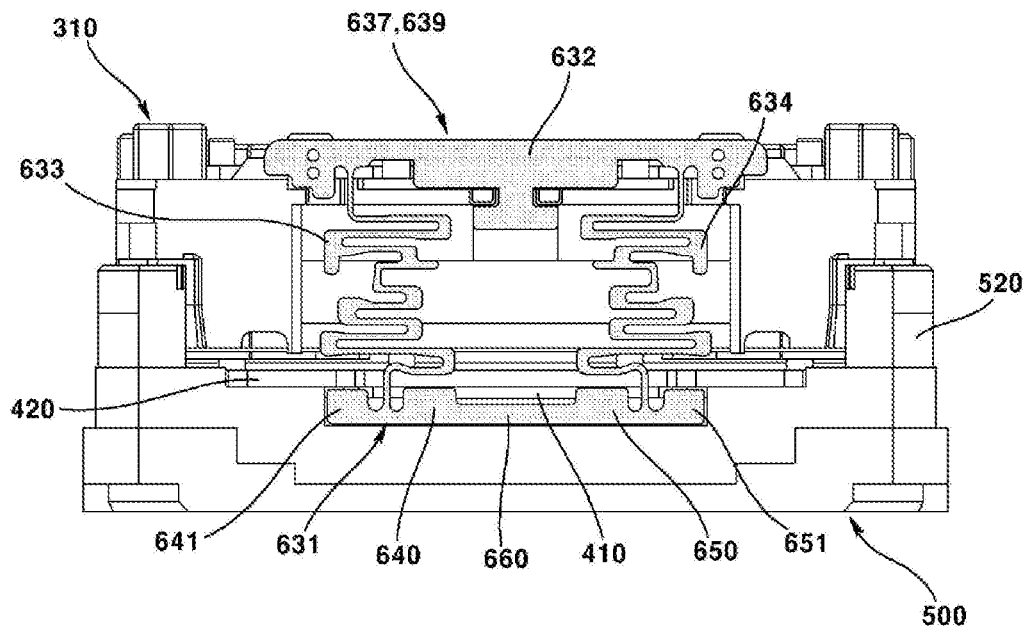
FIG. 7 is a lateral view illustrating some elements of a lens driving device viewed from a 'B' direction of FIG. 1.

Hereinafter, configuration of lens driving device will be described in detail according to an exemplary embodiment of the present invention in reference to the accompanying drawings, FIG. 1 is a perspective view illustrating a lens driving device according to an exemplary embodiment of the present invention, FIG. 2 is an exploded perspective view illustrating a lens driving device according to an embodiment of the present invention, FIG. 3 is a perspective view illustrating some elements of a lens driving device according to an exemplary embodiment of the present invention, FIG. 4 is an exploded perspective view illustrating some elements of a lens driving device according to an exemplary embodiment of the present invention, FIG. 5 is a plane view illustrating some elements of a lens driving device according to an exemplary embodiment of the present invention, FIG. 6 is a lateral view illustrating some elements of a lens driving device viewed from a 'A' direction of FIG. 1, and FIG. 7 is a lateral view illustrating some elements of a lens driving device viewed from a 'B' direction of FIG. 1.

The lens driving device according to the exemplary embodiment of the present invention may include a cover member (100), a first mover (200), a second mover (300), a stator (400), a base (500), a support member (600), a sensor part and a conducting member (800). However, the lens driving device according to the exemplary embodiment of the present invention may omit any one of the cover member (100), the first mover (200), the second mover (300), the stator (400), the support member (600), the sensor part and the conducting member (800). Inter alia, the sensor part may be omitted because the sensor part is an element for AF feedback function and/or OIS feedback function.

The cover member (100) may form an exterior look of lens driving device. The cover member (100) may take a bottom-opened cubic shape. However, the shape of the cover member (100) is not limited thereto. The cover member (100) may be formed with a metal material. To be more specific, the cover member (100) may be formed with a metal plate. In this case, the cover member (100) may prevent shield an EMI (Electromagnetic Interference). Because of this characteristic in the cover member (100), the cover member (100) may be called an "EMI shield can". The cover member (100) may be connected to a ground part on a PCB (40), whereby the cover member (100) may be grounded. The cover member (100) may prevent electric waves generated from outside of the lens driving device from entering an inside of the cover member (100). Furthermore, the cover member (100) may prevent the electric waves generated from inside of the cover member (100) from being emitted to outside of the cover member (100). However, the material of cover member (100) is not limited thereto.

The cover member (100) may include an upper plate (101) and a lateral plate (102). The cover member (100) may include an upper plate (101) and a lateral plate (102) extended from an outer periphery of the upper plate (101) to a lower (lower) side.

A lower end of the lateral plate (102) at the cover member (100) may be mounted on the base (500). The cover member (100) may be mounted on the base (500) by allow an inside surface to be adhered to a portion or all of a lateral surface of the base (500). An inner space formed by the cover member (100) and the base (500) may be disposed with the first mover (200), the second mover (300), the stator (400) and the support member (600). Through this configuration, the cover member (100) can protect inner elements from an external impact and simultaneously prevent infiltration of external foreign objects. However, the present invention is not limited thereto, and a lower end of the lateral plate (102) of the cover member (100) may be directly coupled to the PCB disposed at a lower side of the base (500).

The cover member (100) may include an opening (110) formed at the upper plate (101) to expose the lens module. The opening (110) may be formed in a shape corresponding to that of the lens module. The size of opening (110) may be formed to be greater than that of a diameter of the lens module in order to allow the lens module to be assembled through the opening (110). Meantime, a light introduced through the opening (110) may pass through the lens module. At this time, the light having passed the lens module may be obtained by the image sensor as an image.

The first mover (200) may be coupled to a lens module, one of the constitutional elements of camera module {however, the lens module may be explained as one of the elements of the lens driving device}. The first mover (200) may be accommodated into an inside of the lens module. An inner peripheral surface of the first mover (200) may be coupled by an outer peripheral surface of the lens module. The first mover (200) may move integrally with the lens module through an interaction with the second mover (300) and/or with the stator (400). That is, the first mover (200) may integrally move with the lens module.

The first mover (200) may include a bobbin (210) and a first driving part (220). The first mover (200) may include a bobbin (210) coupled to the lens module. The first mover (200) may include a first driving part (220) disposed at the bobbin (210) to be moved through an interaction with a second driving part (320).

The bobbin (210) may be coupled to an inside of the housing (310). The bobbin (210) may move to an optical axis direction relative to the housing (310). The bobbin (210) may be disposed at the through hole (311) of the housing (310). The bobbin (210) may be movably accommodated into the through hole (311) of the housing (310) to a first direction. The bobbin (210) may be coupled to the lens module. To be more specific, an inner peripheral surface of bobbin (210) may be coupled by an outer peripheral surface of lens module. The bobbin (210) may be coupled by the first driving part (220). An upper surface of bobbin (210) may be coupled by an upper support member (610).

The bobbin (210) may include a lens receptor part (211), a first driving portion coupling portion (212), and an upper coupling portion (213).

The bobbin (210) may be disposed at an inside with an upper/bottom-opened lens receptor part (211). The bobbin (210) may include a lens receptor part (211) formed at an inside. The lens receptor part (211) may be coupled with the lens module. An inner peripheral surface of lens receptor part (211) may be formed with a screw thread in a shape corresponding to that of a screw thread formed at an outer peripheral surface of the lens module. That is, the lens receptor part (211) may be screw-connected by the lens module. An adhesive may be interposed between the lens module and the bobbin (210). At this time, the adhesive may be an epoxy cured by UV and heat. That is, the lens module and the bobbin (210) may be adhered by UV-curing epoxy and/or a heat-curing epoxy.

The bobbin (210) may include a first driving portion coupling part (212) disposed with the first driving part (220). The first driving portion coupling part (212) may be integrally formed with an outer circumferential surface of bobbin (210). Furthermore, the first driving portion coupling part (212) may be continuously formed along the outer peripheral surface of bobbin (210) or may be formed by being spaced apart from the outer peripheral surface of bobbin (210). For example, the first driving portion coupling part (212) may be formed by allowing a portion of the outer circumferential surface of bobbin (210) to be recessed in a shape corresponding to that of the first driving part (220). At this time, a coil of the first driving part (220) may be directly wound on the first driving part coupling part (212). In a modification, the first driving portion coupling part (212) may be formed in an upper or a bottom side-opened shape. At this time, the coil of the first driving part (220) may be inserted and coupled to the first driving portion coupling part (212) through the opened portion while the coil is in a pre-wound state.

The bobbin (210) may include an upper coupling part (213) coupled with the upper support member (610). The upper coupling part (213) may be coupled with an inner peripheral surface (612) of the upper support member (610). For example, a lug (not shown) of the upper coupling part (213) may be coupled by being inserted into a groove or a hole (not shown) of the inner peripheral surface (612) of the upper support member (610). At this time, the lug of the upper coupling part (213) may fix the upper support member (610) by being fused in a state of being inserted into a hole of the inner peripheral surface (612).

The first driving part (220) may be disposed at the bobbin (210). The first driving part (220) may be disposed to face a second driving part (320). The first driving part (220) may move the bobbin (210) relative to the housing (310) through an electromagnetic interaction with the second driving part (320).

The first driving part (220) may include a coil. At this time, the first driving part (220) may be called an AF (Auto Focus) coil part. Furthermore, the first driving part (220) may be called a "first coil part" in order to be distinguished from other elements formed with a coil part. The AF coil part may be disposed at the bobbin (210). The AF coil part may be wound on an outer circumferential surface of bobbin (210) by being guided to the first driving portion coupling part (212). Furthermore, in another exemplary embodiment, the AF coil part may be formed with four (4) independent coils, each spaced apart, and the four coils may be disposed at an outer peripheral surface of bobbin (210) to allow forming a 90° between adjacent two coils. The AF coil part may face a driving magnet part of the second driving part (320). That is, the AF coil part may be so disposed as to electromagnetically interact with the driving magnet part.

The AF coil part may include a pair of lead cables in order to supply a power. In this case, the pair of lead cables on the AF coil part may be electrically coupled to first and second upper elastic units (615, 616), which are divided elements of the upper elastic member (610). That is, the AF coil part may receive a power through the upper elastic member (610). Meantime, when a power is supplied to the AF coil part, an electromagnetic field may be generated about the AF coil part. In a modification, the first driving part (220) may include a magnet part. At this time, the second driving part (320) may include a coil part.

The second mover (300) may move in order to perform an OIS function. The second mover (300) may be disposed at an outside of the first mover (200) to face the first mover (200) and may move the first mover (200) or may move along with the first mover (200). The second mover (300) may be movably supported by the stator (400) disposed at a lower side and/or the base. The second mover (300) may be disposed at an inner space of the cover member (100).

The second mover (300) may include a housing (310) and a second driving part (320). The second mover (300) may include a housing (310) disposed at an outside of the bobbin (210). Furthermore, the second mover (300) may include a second driving part (320) disposed to face the first driving part (220) and fixed at the housing (310).

At least one portion of the housing (310) may be formed in a shape corresponding to an inner circumferential surface of the cover member (100). Particularly, an outer circumferential surface of housing (310) may be formed with a shape corresponding to an inner circumferential surface of the lateral plate (102) of the cover member (100). The housing (310) may take a cubic shape including four lateral surfaces. However, the housing (310) may take any shape as long as the housing (310) can be housed in the cover member (100). The housing (310) may be formed in an injection-molded article in consideration of productivity.

The housing (310) may be disposed at an upper side of the base (500). The housing (310) is a portion that is moved OIS driving and may be spaced apart from the cover member (100) at a predetermined distance. However, the housing (310) may be fixed on the base (500) in the AF model. Alternatively, the housing (310) may be omitted and the second driving part (320) may be fixed on the cover member (100). An upper surface of housing (310) may be coupled with the upper support member (610). The housing (310) may include a through hole (311), a second driving portion coupling part (312) and an upper coupling part (313).

The housing (310) may be opened at an upper side and a lower side to allow the first driving part (200) to vertically move. The housing (310) may be formed at an inside with an upper/bottom-opened through hole (311). The through hole (311) may be movably disposed with the bobbin (210). That is, the through hole (311) may be formed in a shape corresponding to that of the bobbin (210). Furthermore, an inner circumferential surface of the housing (310) forming the through hole (311) may be spaced apart from an outer circumferential surface of bobbin (210).

The housing (310) may include, at a lateral surface, a second driving portion coupling part (312) formed in a shape corresponding to that of the second driving part (320) to accommodate the second driving part (320). That is, the second driving portion coupling part (312) may accommodate the second driving part (320) and fix the second driving part (320). The second driving part (320) may be fixed to the second driving portion coupling part (312) using an adhesive (not shown). Meantime, the second driving portion coupling part (312) may be disposed at an inner circumferential surface of housing (310). In this case, this structural configuration may provide an advantageous electromagnetic interaction with the first driving part (220) disposed at an inside of the second driving part (320). Furthermore, the second driving portion coupling part (312) may take a bottom-opened shape, for example. In this case, an advantageous electromagnetic interaction may be implemented between a third driving part (420) disposed at a lower side of the second driving part (320) and the second driving part (320). The second driving portion coupling part (312) may be formed in a four pieces, for example. Each of the four second driving portion coupling part (312) may be coupled with the second driving part (320). Meantime, the second driving portion coupling part (312) may be formed at a corner part meeting a lateral surface adjacent to the housing (310). Alternatively, the second driving portion coupling part (312) may be formed at a lateral surface of the housing (310).

The housing (310) may include an upper coupling part (313) coupled to the upper support member (610). The upper coupling part (313) may be coupled to an external part (611) of the upper support member (610). For example, a lug of the upper coupling part (313) may be coupled to a groove or a hole of the external part (611) of the upper support member (610) by being inserted into the groove or the hole. At this time, the lug of the upper coupling part (313) may be fused while being inserted into the hole of the external part (611) to fix the upper support member (610).

The housing (310) may include an upper stopper (315) protruded from one surface of the housing (310). The housing (310) may include an upper stopper (315) protruded from an upper surface to an upper side. The upper stopper (315) may be upwardly protruded from the housing (310). The upper stopper (315) may be overlapped with the cover member (100) to a vertical direction. When the housing (310) moves upwardly through this structure, the upper stopper (315) and the cover member (100) become contacted to restrict the movement of housing (310). That is, the upper stopper (315) may restrict a movement limitation because of mechanical structure of housing (310).

The second driving part (320) may include at least one magnet. The second driving part (320) may be disposed to face the first driving part (220). The second driving part (320) may move the first driving part (220) through an electromagnetic interaction with the first driving part (220). The second driving part (320) may include a magnet part. At this time, the second driving part (320) is a magnet part for driving, and may be called a "driving magnet part". The driving magnet part may be disposed at the housing (310). The driving magnet part may be fixed to the second driving portion coupling part (312). The driving magnet part may be disposed at the housing (310) by being independently formed with four magnets to allow forming a 90° between adjacent two magnets. That is, the driving magnet part can promote an efficient use of inner volume through the magnets mounted at an equidistant interval on four lateral surfaces of the housing (310). However, the present invention is not limited thereto. Meantime, as explained in the foregoing discussion, the first driving part (220) may include the magnet part and the second driving part (320) may include a coil part.

The stator (400) may be disposed at a lower side of second driving part (300). The stator (400) may face the second mover (300). The stator (400) may movably support the second mover (300). The stator (400) may move the second mover (300). At this time, the first mover (200) may also move along with the second mover (300). Furthermore, the stator (400) may be centrally disposed with through holes (411, 412) corresponding to the lens module.

The stator (400) may include a substrate (410) and a third driving part (420). The stator (400) may include a substrate (410) interposed between the third driving part (420) and the base (500). Furthermore, the stator (400) may include, at a lower side of the second driving part (320), a third driving part (420) to face the second driving part (320).

The substrate (410) may include an FPCB which is a flexible Printed Circuit Board. The substrate (410) may be interposed between the base (500) and the housing (310). The substrate (410) may supply a power to the third driving part (420). The substrate (410) may supply a power to the first driving part (220) and the third driving part (320). The substrate (410) may supply a power to an AF coil part through the lateral support member (630) and the upper support member (610). Furthermore, the substrate (410) may supply a power to an AF sensor part (not shown) through the lateral support member (630) and the upper support member (610).

The substrate (410) may include a body part (411), a terminal part (412) and a through hole (413). The substrate (410) may include a body part (411) interposed between the base (500) and the housing (310). The substrate (410) may include a terminal part (412) exposed to an outside by being downwardly bent from the body part (411). The substrate (410) may include a through hole (413) passing through a light having passed through the lens module.

The body part (411) may be interposed between the base (500) and the housing (310). The body part (411) may be disposed with a third driving part (420). The body part (411) may be electrically conducted with the third driving part (420). The body part (411) may be formed with a through hole (413).

The terminal part (412) may be extended by being bent from the body part (411). The terminal part (412) may be exposed to outside by being downwardly bent from the body part (411). The terminal part (412) may be connected to an outside power by being exposed on at least a portion thereof, whereby a power can be supplied to the substrate (410).

The terminal part (412) may be disposed at an outside of an outside distal end of a first lower part (640). The terminal part (412) may be disposed by being spaced apart from a minimal distance from the outside distal end of the first lower part (640). The terminal part (412) may be also disposed at an outside of an outside distal end of a second lower part (650). Meantime, the terminal part (412) may be also disposed by being spaced apart from a minimal distance from the outside distal end of the second lower part (650). Through this structure in the exemplary embodiment of the present invention, when a width to a horizontal direction of the first lower terminal part (640) is narrowed, a width to a horizontal direction of the terminal part (412) may be increased. That is, a spatial restriction of design space in a circuit pattern of a PCB formed at the terminal part (412) may be reduced in the present exemplary embodiment.

The third driving part (420) may include a coil. The third driving part (420) may move the second driving part (320) through an electromagnetic interaction. The third driving part (420) may include a coil part. At this time, the third driving part (420) may be called an OIS coil part. Furthermore, the third driving part (420) may be called a "second coil part" in order to distinguish from a first coil part. It should be apparent that the coil part of the third driving part may be called a first coil part and the coil part of the first driving part may be called a second coil part.

The OIS coil part may be disposed at the substrate. The OIS coil part may be interposed between the base (500) and the housing (310). The OIS coil part may face a driving magnet part. When a power is supplied to the OIS coil part, the second driving part (320) and the housing (310) fixed by the housing (310) may integrally move by an electromagnetic interaction between the OIS coil part and the driving magnet part. The third driving part (420) may be a circuit member in which a coil and a substrate are integrally formed. The third driving part (420) may include a substrate separately formed from the substrate (410) and a pattern coil formed on the substrate.

The OIS coil part may be formed with an FP (Fine Pattern) coil mounted on the substrate (410). In this case, there may be an effective point in the aspect of miniaturization of lens driving device (reducing a height to a z axis direction which is an optical axis direction). The OIS coil part may be so formed as to minimize an interference with an OIS sensor part (700) disposed at a lower side, for example. The OIS coil part may be so disposed as not to overlap with the OIS sensor part (700) to a vertical direction.

The OIS coil part may include first to fourth coil unit (422, 423, 424, 425), each spaced apart from the other. The first coil unit (422) may be disposed at a first corner part (505) of base (500). The second coil unit (423) may be disposed at a third corner part (507) of base (500). The third coil unit (424) may be disposed at a second corner part (506) of base (500). The fourth coil unit (425) may be disposed at a fourth corner part (508) of base (500).

The first coil unit (422) may be directly connected to a first conducting part (801). The second coil unit (423) may be directly connected to a third conducting part (803). The third coil unit (424) may be directly connected to a second conducting part (802). The fourth coil unit (425) may be directly connected to a fourth conducting part (804). That is, the first and second coil units (422, 423) may be diagonally disposed as illustrated in FIG. 3. Furthermore, the third and fourth coil units (424, 425) may be diagonally disposed as illustrated in FIG. 3. For example, the first coil unit (422), the third coil unit (424), the second coil unit (423) and the fourth coil unit (425) may be sequentially disposed to a counterclockwise direction.

The OIS coil part may include a first connecting coil unit (426) and a second connecting coil unit (427). The first connecting coil unit (426) may directly connect the first coil unit (422) and the second coil units (423). The second connecting coil unit (427) may directly connect the third coil unit (424) and the fourth coil unit (425).

The OIS coil unit may include a body part (428) disposed with the first to fourth coil units (422, 423, 424, 425). The body part (428) may provide an electrically conducting structure to the first to fourth coil units (422, 423, 424, 425). The body part (428) may be a PCB. However, the present invention is not limited thereto. A shape of a first lateral surface (501) side at the OIS coil unit may correspond to that of a first lateral surface (501) side at the substrate (410). The body part (428) of the OIS coil part and the substrate (410) may be formed in a mutually corresponding size and shape for at least on some portions. Through this structure, an arrangement space of the first to fourth coil units (422, 423, 424, 425) may be obtained even if a diameter of the through hole (421) grows larger in order to improve the resolution.

A vertical distance (optical axis direction) between the driving magnet part and the OIS coil part may be 100 μm. Furthermore, a vertical distance may be 80~120 μm. The distance between the driving magnet part and the OIS coil part affects an electromagnetic interaction between the driving magnet part and the OIS coil part, such that the electromagnetic interaction for OIS driving can be secured by reducing a distance between the driving magnet part and the OIS coil part even if the number of winding on the OIS coil is reduced according to the present exemplary embodiment.

The third driving part (420) may be disposed with a through hole (421) through which a light of the lens module can pass. The through hole (421) may have a diameter corresponding to that of the lens module. The through hole (421) of third driving part (420) may have a diameter corresponding to that of the through hole (411) of the substrate (410). The through hole (421) of the third driving part (420) may have a diameter corresponding to that of a through hole (510) of the base (500). The through hole may have a round shape, for example. However, the present invention is not limited thereto.

The base (500) may be disposed at a lower side of the bobbin (210). The base (500) may be disposed at a lower side of the housing (310). The base (500) may support the second mover (300). A lower side of the base (500) may be disposed with a PCB. The base (500) may perform a sensor holder function protecting an image sensor mounted on the PCB.

The base (500) may include a through hole (510), an extension part (520), a sensor mounting part (530) and a foreign object collection part (not shown).

The base (500) may include a through hole (510) formed at a position corresponding to that of lens receptor part (211) at the bobbin (210). Meantime, the through hole (510) of base (500) may be coupled with an IR (Infrared Ray) filter. However, the IR filter may be coupled to a separate sensor holder disposed at a lower surface of the base (500). The base may include an extension part (520) extended from an upper surface to an upper side. The extension part (520) may be upwardly protruded from an upper surface of the base (500). The extension part (520) may be disposed at a first corner part (505). The extension part (520) may include first to fourth lugs respectively formed at first to fourth corner parts (505, 506, 507, 508) of base (500).

An outer circumferential surface of housing (310) may be formed with first to fourth grooves respectively corresponding to the first to fourth lugs. The first to fourth grooves may be accommodated by the first to fourth lugs in pairs. That is, at least one portion of housing (310) may be disposed at an inside of the extension part (520). Through this structure, the housing (310) may be restricted to a horizontal direction (a direction perpendicular to an optical axis direction). That is, the extension part (520) of the base (500) may function as a stopper relative to a lateral movement of the housing (310). A damper (not shown) may be interposed between the extension part (520) of base (500) and the housing (310). The damper may prevent a resonant phenomenon that may be generated from auto focus feedback control and/or the OIS feedback control.

The base (500) may include a sensor mounting part (530) coupled by the OIS sensor part (700). That is, the OIS sensor part (700) may be mounted on the sensor mounting part (530). At this time, the OIS sensor part (700) may detect the horizontal movement or tilt of housing (310) by detecting the second driving part (320) coupled to the housing (310). The sensor mounting part (530) may be formed in two pieces, for example. Each of the two sensor mounting parts (530) may be disposed with the OIS sensor part (700). The OIS sensor part (700) may include a first axis sensor (710) and a second axis sensor (720) so arranged as to detect both the x axis and y axis directional movements of housing (310).

The base (500) may include a receptor groove (540) having a shape corresponding to at least one portion of a third lower part (660) by being inwardly recessed from an outer lateral surface. The receptor groove (540) may be inwardly recessed from an outer lateral surface of the base (500). The receptor groove (540) may have a shape corresponding to at least one portion of the third lower part (660). The receptor groove (540) may accommodate at least one portion of the third lower part (660). The receptor groove (540) may be coupled with a lower coupling part (631) of the lateral support member (630) by being coated with an adhesive member.

The base (500) may include a foreign object collection part collecting foreign object introduced inside of the cover member (100). The foreign object collection part may be disposed at an upper surface of the base (500) and includes an adhesive material to collect a foreign object in an inside space formed by the cover member (100) and the base (500).

The base (500) may include first to fourth lateral surfaces (501, 502, 503, 504) each sequentially and adjacently arranged. That is, the first lateral surface (501) may be adjacently formed to the second and fourth lateral surfaces (502, 504). The second lateral surface (502) may be adjacently formed to first and third lateral surfaces (501, 503). The third lateral surface (503) may be adjacently formed to the second and fourth lateral surfaces (502, 504). The fourth lateral surface (504) may be adjacently formed to the third and first lateral surfaces (503, 501).

The base (500) may include first to fourth corner parts (505, 506, 507, 508) disposed between the first to fourth lateral surfaces (501, 502, 503, 504). That is, the first corner part (505) may be disposed between the first and second lateral surfaces (501, 502). The second corner part (506) may be disposed between the second and third lateral surfaces (502, 503). The third corner part (507) may be disposed between the third and fourth lateral surfaces (503, 504). The fourth corner part (508) may be disposed between the fourth and first lateral surfaces (504, 501).

The support member (600) may connect any of two or more of the first mover (200), the second mover (300), the stator (400) and the base (500). The support member (600) may elastically connect any of two or more of the first mover (200), the second mover (300), the stator (400) and the base (500) to support a relative movement between each element. The support member (600) may be so formed as to have elasticity on at least one portion thereof. In this case, the support member (600) may be called an elastic member or a spring.

The support member (600) may include an upper support member (610) and a lateral support member (630). At this time, the upper support member (610) may be called an "auto focus spring", an "AF elastic member" and the like. Furthermore, the lateral support member (630) may be called an "OIS spring", an "OIS elastic member" and the like. Furthermore, the support member (600) may further include a lower support member (not shown), for example.

The upper support member (610) may be called an "upper elastic member". The upper support member (610) may elastically support the bobbin (210) relative to the housing (310). The upper support member (610) may include an outer part (611), an inner part (612) and a connecting part (613). The upper support member (610) may include an outer part (611) coupled with the housing (310), an inner part (612) coupled with the bobbin (210), and a connecting part (613) elastically connecting the outer part (611) and the inner part (612).

The upper support member (610) may be connected to an upper surface of the first mover (200) and to an upper surface of the second mover (300). To be more specific, the upper support member (610) may be coupled an upper surface of bobbin (210) and to an upper surface of housing (310). The inner part (612) of upper support member (610) may be coupled to an upper coupling part (213) of bobbin (210), and the outer part (611) of upper support member (610) may be coupled to an upper coupling part (313) of housing (310).

The upper support member (610) may be separated to a pair to be used for supply of an electric power to an AF coil part and the like. The upper support member (610) may include a first upper elastic unit (614) and a second upper elastic unit (615), each spaced apart from the other. The first upper elastic unit (614) may be electrically connected to one end of the AF coil part, and the second upper elastic unit (615) may be electrically connected to the other end of the AF coil part. The upper support member (610) can supply an electric power to the AF coil part through this structure. The upper support member (610) may receive the electric power from the substrate (410) through the lateral support member (630). The upper support member (610) may be disposed by being separated into six (6) pieces. At this time, four of the six upper support member (610) may be electrically conducted to the AF sensor part, and the remaining two may be electrically conducted to the AF coil part.

The lower support member may include an outer part, an inner part and a connecting part. The lower support member may include an outer part coupled with the housing (310), an inner part coupled with the bobbin (210) and a connecting part elastically connecting the outer part and the inner part. The lower support member may be integrally formed. However, the present invention is not limited thereto. In a modification, the lower support member may be divided into a pair for use of power supply to the AF coil part and the like.

The lateral support member (630) may be coupled to the base (500) and the housing (310). The lateral support member (630) may elastically support the housing (310) relative to the base (500). The lateral support member (630) may be coupled at one side to the stator (400) and/or to the base (500), and may be coupled to the upper support member (610) and/or to the housing (310) at the other side. The lateral support member (630) may be coupled to the base (500) at one side and may be coupled to the housing (310) at the other side. Furthermore, the lateral support member (630) in another exemplary embodiment may be coupled to the stator (400) at one side and may be coupled to the upper support member (610) at the other side. Through this structure, the lateral support member (630) may elastically support the second mover (300) relative to the stator (400) to allow the second mover (300) to move horizontally or tilt. The lateral support member (630) may include a leaf spring, for example. Alternatively, the lateral support member (630) may include a plurality of wires as a modification. Meantime, the lateral support member (630) may be integrally formed with the upper support member (610).

The lateral support member (630) may include a lower coupling part (631), an upper coupling part (632), a first connecting part (633) and a second connecting part (634). At this time, the first connecting part (633) and the second connecting part (634) may be commonly called a "connecting part". The lateral support member (630) may include a lower coupling part (631) coupled to the base (500). The lateral support member (630) may include an upper coupling part (632) coupled to the housing (310). The lateral support member (630) may include a first connecting part (633) connecting the lower coupling part (631) and the upper coupling part (632). The lateral support member (630) may include a second connecting part (634) connecting the lower coupling part (631) and the upper coupling part (632), and spaced apart from the first connecting part (633). At this time, the first connecting part (633) may be connected to an outer distal end of a first lower part (640). Furthermore, the second connecting part (634) may be connected to an outer distal end of a second lower part (650).

The lower coupling part (631) may include a first lower part (640), a second lower part (650) and a third lower part (660). The lower coupling part (631) may include a first lower part (640) connected to the first connecting part (633). The lower coupling part (631) may include a second lower part (650) connected to the second connecting part (634).

The lower coupling part (631) may include a third lower part (660) directly connecting the first lower part (640) and the second lower part (650).

The third lower part (660) may be overlapped with the base (500) to a direction perpendicular to an optical axis direction. The entire area of third lower part (660) may be overlapped with the base (500) to a direction perpendicular to an optical axis direction. That is, the lower part (660) may be disposed on the substrate (410) disposed at an upper surface of base (500) and a lower side of the third driving part (420). Through this structure, the third lower part (660) and the base (500) can be directly fixed, such that the fixing power between the lateral support member (630) and the base (500) can be improved over a structure of only fixing the first lower part (640) and the second lower part (650) to the base (500). Furthermore, the third lower part (660) is disposed at a lower side of the first connecting part (633) and the second connecting part (634) such that a design space of the first connecting part (63) and the second connecting part (634) can be secured. Meantime, in the present structure, the third lower part (660) and the substrate (410) may be directly conducted. To be more specific, an inside at an upper center part of the third lower part (660) and the substrate (410) may be coupled by an electrically conducting unit (not shown) to allow the third lower part (660) and the substrate (410) to be electrically conducted.

The substrate (410) may include an insertion hole between the body part (411) and the terminal part (412), and the lower coupling part (631) may be so disposed as to pass through the insertion hole of the substrate (410). Through this structure, an electrically conducting unit may be coupled to an inside of the third lower part (660) of the lower coupling part (631) and to an outside of the body part (411) at the substrate (410). In this case, the electrically conducting unit disposed at an upper center part of the third lower part (660) may be isolated from an electrically conducting member (800) electrically conducting the substrate (410) and the third driving part (420) to thereby prevent a short-circuit phenomenon between the conducting unit and the electrically conducting member (800). At this time, and the electrically conducting member (800) electrically conducting the substrate (410) and the third driving part (420) may be disposed at an inside of the first connecting part (633) and/or the second connecting part (634).

The third lower part (660) may be disposed on an imaginary plane straightly connecting the first lower part (640) and the second lower part (650). A portion of the third lower part (660) may be disposed on an imaginary plane straightly connecting the first lower part (640) and the second lower part (650). Furthermore, an entire area of the third lower part (660) may be disposed at an inside of an imaginary plane straightly connecting the first lower part (640) and the second lower part (650). In this case, the size of the third lower part (660) may be smaller than the size of the imaginary plane.

A length of the third lower part (660) to an optical axis direction may be constant up to a second lower part (650) side from a first lower part (640) side. Meantime, a length of the third lower part (660) to an optical axis direction may correspond to a length of the first lower part (640) and the second lower part (650) to an optical axis direction. Alternatively, a length of the third lower part (660) to an optical axis direction may be smaller than a length of the first lower part (640) and the second lower part (650) to an optical axis direction.

The third lower part (660) may be directly contacted to the substrate (410) through the electrically conducting unit. At this time, the electrically conducting unit may include a solder ball formed through the soldering process. The third lower part (660) and the substrate (410) may be electrically conducted while soldering is performed at an upper end of the third lower part (660) and a lower part of the substrate (410). Through this structure, a solder ball electrically conducting the third lower part (660) and the substrate (410) may be spaced apart from a solder ball electrically conducting the substrate (410) and the third driving part (420). Thus, a phenomenon of both elements being short-circuited can be minimized while any one solder ball is sputtered on the other solder ball according to the present exemplary embodiment.

The lower coupling part (631) of the lateral support member (630) may be accommodated into the receptor groove (540) of the base (500). The lower coupling part (631) of the lateral support member (630) may be adhered and fixed to the base (500) by an adhesive member (not shown). To be more specific, the first lower part (640) may be adhered to the base (500) by a first adhesive part (not shown). The second lower part (650) may be adhered to the base (500) by a second adhesive part (not shown). The third lower part (660) may be adhered to the base (500) by a third adhesive part (not shown). The first adhesive part may be interposed between the first lower part (640) and the base (500). The second adhesive part may be interposed between the second lower part (650) and the base (500). The third adhesive part may be interposed between the third lower part (660) and the base (500).

The lateral support member (630) may be electrically connected to the substrate (410) at one distal end and electrically connected to the upper support member (610) at the other distal end. The lateral support member (630) may be formed in four (4) pieces, for example. That is, the lateral support member (630) may include first to fourth lateral support units (636, 637, 638, 639), each mutually spaced part from the other. The lateral support member (630) may include a first lateral support unit (636) disposed at the first lateral surface (501) of the base (500). The lateral support member (630) may include a second lateral support unit (637) disposed at the second lateral surface (502) of the base (500). The lateral support member (630) may include a third lateral support unit (638) disposed at the third lateral surface (503) of the base (500). The lateral support member (630) may include a fourth lateral support unit (639) disposed at the fourth lateral surface (504) of the base (500). That is, the first to fourth lateral support units (636, 637, 638, 639) may be continuously and adjacently disposed.

The first lateral support unit (636) may electrically connect the first upper elastic unit (614) and the substrate (410). Furthermore, the third lateral support unit (638) may electrically connect the second upper elastic unit (615) and the substrate (410). Through this structure, the upper support member can be electrically conducted with the substrate (410). Furthermore, the substrate (410) can supply a power to the AF coil part connected to the upper support member (610). The first lateral support unit (636) may be electrically conducted to the substrate (410) through the first electrically conducting unit (not shown). The third lateral support unit (638) may be electrically conducted to the substrate (410) through the second electrically conducting unit (not shown). The first and second electrically conducting units may be spaced apart from the electrically conducting member (800). The first and second electrically conducting units may be solder balls formed by the soldering process. In the present exemplary embodiment, because a spaced-apart space can be secured between the first and second conducting units and the conducting member (800) as mentioned above, the phenomenon that the conducting member (800) is short-circuited by penetration of the solder balls of the first and second conducting units can be minimized.

The lateral support member (630) or the upper support member (610) may include a shock absorption part (not shown) for absorbing a shock, for example. The shock absorption part may be disposed on at least one or more of the lateral support member (630) and the upper support member (610). The shock absorption part may be a separate member like a damper. Furthermore, the shock absorption part may be realized through a shape change of at least a portion of more than any one of the lateral support member (630) and the upper support member (610).

The sensor part may be used for more than any one of the auto focus feedback and OIS feedback. The sensor part may detect a position or movement of more than any one of the first mover (200) and the second mover (300). The sensor part may include an AF sensor part and an OIS sensor part (700). The AF sensor part may provide information for AF feedback by sensing a relative vertical movement of the bobbin (210) to the housing (310). The OIS sensor part (700) may provide information for OIS feedback by detecting a horizontal movement or tilt of the second mover (300).

The AF sensor part may include an AF sensor (not shown), a sensor substrate (not shown) and a sensing magnet (not shown). The AF sensor may be disposed at the housing (310). The AF sensor may be disposed at an upper surface of the housing (310). At this time, the sensing magnet may be disposed at an upper surface of bobbin (210). The AF sensor may be mounted on the sensing substrate. The AF sensor may be disposed at the housing (310) while being mounted on the sensing substrate. The AF sensor may detect a position or a movement of bobbin (210). The AF sensor may detect a position or a movement of bobbin (210) by detecting the sensing magnet disposed on the bobbin (210), for example. The AF sensor may be a Hall sensor detecting a magnetic force of sensing magnet. However, the present invention is not limited thereto.

The sensor substrate may be mounted with an AF sensor. The sensor substrate may be disposed with the housing (310). The sensor substrate may be electrically conducted with the upper support member (610). Through this structure, the sensor substrate may supply a power to the AF sensor and transmit/receive information or a signal from the controller. The sensor substrate may include a terminal part (not shown). The terminal part may be electrically connected with the upper support member (610).

The sensing magnet may be disposed at the bobbin (210). At this time, the sensing magnet may be called a "second magnet" in order to be distinguished from the "first magnet", which is a driving magnet. The lens driving device in the exemplary embodiment may further comprise a compensation magnet (not shown) disposed at the bobbin (210) to be diagonally disposed with the sensing magnet based on a center of bobbin (210). The compensation magnet may be called a "third magnet" in order to be distinguished from the first and second magnets. The compensation magnet may be so disposed as to perform a magnetic balance with the sensing magnet. That is, the compensation magnet may be disposed to solve the magnetic imbalance generated by the sensing magnet. The sensing magnet may be disposed at one side of the bobbin (210), and the compensation magnet may be disposed at the other side of the bobbin (210).

The OIS sensor part (700) may be disposed at the stator (400). The OIS sensor part (700) may be disposed at an upper surface or a lower surface of substrate (410). The OIS sensor part (700) may be disposed at a lower surface of substrate (410) to be disposed at the sensor mounting part (530) formed at the base (500). The OSI sensor part (700) may include a Hall sensor, for example. In this case, the sensor part (700) may sense a relative movement of the second mover (300) relative to the stator (400) by sensing the magnetic field of the second driving part (320). The OIS sensor part (700) may detect all the x axis and y axis movements of the second mover (300), including the first axis sensor (710) and the second axis sensor (720). Meantime, the OIS sensor part (700) may be so disposed as not to vertically overlap the FP coil of the third driving part (420).

The (electrically) conducting member (800) may electrically connect the OIS coil part with the substrate (410). The conducting member (800) may include first to fourth conducting parts (801, 802, 803, 804), each mutually spaced apart from the other. The first to fourth conducting parts (801, 802, 803, 804) may be so formed as to be paired with the first to fourth corner parts (505, 506, 507, 508) of the base (500). The first corner part (505) of base (500) may be interposed between the first lateral surface (501) and the second lateral surface (502) of the base (500) and a distance between the conducting member (800) and the first lateral surface (501) may correspond to a distance between the conducting member (800) and the second lateral surface (502). The conducting member (800) may be disposed at an inside of the extension part (520) of base (500). A lateral part of base (500) may not be disposed with the conducting member (800) electrically connecting the OIS coil part and the substrate (410).

The OIS coil part and the substrate (410) may be electrically connected only by the first to fourth conducting parts (801, 802, 803, 804). That is, the OIS coil part and the substrate (410) may be electrically conducted only by the four conducting parts (801, 802, 803, 804).

The first conducting part (801) may be disposed to be nearer to the first corner part (505) than the first lateral surface (501) and the second lateral surface (502) of base (500). The first conducting part (801) may be disposed on an imaginary line that connects the extension part (520) of base (500) and a center of base (500). A distance between the first conducting part (801) and the first lateral support unit (636) may correspond to a distance between the first conducting part (801) and the second lateral support unit (637).

The second conducting part (802) may be disposed to be nearer to the second corner part (506) than the second lateral surface (502) and the third lateral surface (503) of base (500). The second conducting part (802) may be disposed on an imaginary line that connects the extension part (520) of base (500) and a center of base (500). A distance between the second conducting part (802) and the second lateral support unit (637) may correspond to a distance between the second conducting part (802) and the third lateral support unit (638).

The third conducting part (803) may be disposed to be nearer to the third corner part (507) than the third lateral surface (503) and the fourth lateral surface (504) of base (500). The third conducting part (803) may be disposed on an imaginary line that connects the extension part (520) of base (500) and a center of base (500). A distance between the third conducting part (803) and the third lateral support unit (638) may correspond to a distance between the third conducting part (803) and the fourth lateral support unit (639).

The fourth conducting part (804) may be disposed to be nearer to the fourth corner part (508) than the fourth lateral surface (504) and the first lateral surface (501) of base (500). The fourth conducting part (804) may be disposed on an imaginary line that connects the extension part (520) of base (500) and a center of base (500). A distance between the fourth conducting part (804) and the fourth lateral support unit (639) may correspond to a distance between the fourth conducting part (804) and the first lateral support unit (636).

Hereinafter, an operation of camera module according to an exemplary embodiment will be described.

First, an auto focus function of camera module according to an exemplary embodiment will be described.

When a power is supplied to the AF coil part of the first driving part (220), the first driving part (220) may move relative to the magnet part of second driving part (320) by the electromagnetic interaction between the AF coil part and the second driving part (320). At this time, the bobbin (210) coupled with the first driving part (220) may integrally move along with the first driving part (220). That is, the bobbin (210) coupled at an inside by the lens module may move to an optical axis direction (vertical direction) relative to the housing (310). The bobbin's movement like this may result in the lens module moving nearer to or moving distantly from the image sensor, whereby the focus adjustment can be performed to a subject by supplying a power to the AF coil part of the first driving part (220) in the exemplary embodiment.

Meantime, the camera module according to the exemplary embodiment may be applied with an auto focus feedback in order to realize a more accurate performance over the auto focus function. The AF sensor disposed at the housing (310) and formed with a Hall sensor may detect a magnetic field of the sensing magnet fixed to the bobbin (210). Thus, when the bobbin (210) performs a relative movement to the housing (310), an amount of magnetic field detected by the AF sensor may be changed. The AF sensor may transmit a detected value to the controller by detecting a movement to a z axis direction or position of bobbin (210) using this method. The controller may determine whether to perform an additional movement to the bobbin (210) using the received detected value. This process is generated in real time, and therefore, the auto focus function of the camera module according to the exemplary embodiment can be more accurately performed through the auto focus feedback.

Now, the OIS function of camera module will be described according to the exemplary embodiment.

When a power is supplied to the OIS coil part of the third driving part (420), the second driving part (320) may move relative to the third driving part by the electromagnetic interaction between the OIS coil part and the driving magnet part of the second driving part (320). At this time, the housing (310) coupled by the second driving part (320) may integrally move along with the second driving part (320). That is, the housing (310) may horizontally move relative to the base (500). However, the housing (310) may be induced with a tilt relative to the base (500). At this time, the bobbin (210) may also integrally move along with the housing (310). Hence, the housing's movement like this may result in the lens module moving to a direction parallel to direction where the image sensor is located, whereby the OIS function can be performed by supplying a power to the OIS coil part of the third driving part (420) in the exemplary embodiment.

Meantime, an OIS feedback may be applied in order to implement a more accurate realization of OIS function of the camera module according to the exemplary embodiment. The pair of OIS sensor part (700) mounted on the base (500) and formed in a Hall sensor may detect a magnetic field of the driving magnet part at the second driving part (320) fixed to the housing (310). Thus, when the housing (310) performs a relative movement relative to the base (500), the magnetic field detected by the OIS sensor part (700) may be changed.

The pair of OIS sensor part (700) may transmit a detected value to the controller by detecting a movement to a horizontal direction (x axis and y axis directions) of housing (310) or position of housing (310) using this method. The controller may determine whether to perform an additional movement to the housing (310) using the received detected value. This process is generated in real time, and therefore, the OIS function of the camera module according to the exemplary embodiment can be more accurately performed through the OIS function.

Although the present invention has been explained with all constituent elements forming the exemplary embodiments of the present disclosure being combined in one embodiment, or being operated in one embodiment, the present invention is not limited thereto. That is, in some cases, the described features, structures, or operations may be selectively combined in any suitable manner in one or more embodiments. In the term "includes", "including", "comprises" and/or "comprising" as used herein, the mentioned component, step, operation and/or device is not excluded from presence or addition of one or more other components, steps, operations and/or devices. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A lens driving device, comprising:
a base;
a housing disposed on the base;
a bobbin disposed in the housing;
a first coil disposed on the bobbin;
a magnet disposed on the housing;
a substrate disposed on the base, the substrate comprising a pattern coil facing the magnet; and
a conducting member comprising only four conducting parts connected with the substrate,
wherein the pattern coil comprises first and second coil units opposite to each other, and third and fourth coil units opposite to each other,
wherein the first coil unit is electrically connected with the second coil unit by a first connection coil unit, and
wherein the third coil unit is electrically connected with the fourth coil unit by a second connection coil unit.

2. The lens driving device of claim 1, wherein a distance between the magnet and the pattern coil is 80 to 120 μm in an optical axis direction.

3. A camera module, comprising:
a printed circuit board;
an image sensor disposed on the printed circuit board;
the lens driving device of claim 1 disposed on the printed circuit board; and
a lens coupled to the bobbin of the lens driving device.

4. An optical apparatus, comprising:
a main body;
the camera module of claim 3 disposed on the main body; and
a display disposed on the main body and outputting an image photographed by the camera module.

5. The lens driving device of claim 1, wherein the base comprises a first lateral surface, a second lateral surface and a first corner part formed between the first lateral surface and the second lateral surface of base, and
wherein the conducting member comprises a first conducting part disposed on the first corner part of the base, and electrically connects the first coil unit.

6. The lens driving device of claim 5, wherein the first corner part of the base is formed with an extension part upwardly extending from an upper surface of the base.

7. The lens driving device of claim 1, wherein the pattern coil is configured to move the housing in a direction perpendicular to an optical axis by interacting with the magnet.

8. The lens driving device of claim 1, wherein the four conducting parts comprise first to fourth conducting parts,
wherein the first conducting part is electrically connected with the first coil unit,
wherein the second conducting part is electrically connected with the second coil unit,
wherein the third conducting part is electrically connected with the third coil unit, and
wherein the fourth conducting part is electrically connected with the fourth coil unit.

9. The lens driving device of claim 1, wherein the magnet comprises first and second magnets opposite to each other, third and fourth magnets opposite to each other,
wherein the first coil unit faces the first magnet,
wherein the second coil unit faces the second magnet,
wherein the third coil unit faces the third magnet, and
wherein the fourth coil unit faces the fourth magnet.

10. The lens driving device of claim 1, wherein the substrate comprises a first connection coil unit connecting the first and second coil units, and a second connection coil unit connecting the third and fourth coil units.

11. The lens driving device of claim 1, further comprising:
an upper elastic member connecting the bobbin and the housing;
a terminal part electrically connected with the pattern coil; and
a support member connected with the upper elastic member,
wherein the upper elastic member comprises first and second upper elastic units spaced apart from each other,
wherein the support member comprises first and second support member units spaced apart from each other, and
wherein the first upper elastic unit connects the first support member unit and a first end of the first coil, and the second upper elastic unit connects the second support member unit and a second end of the first coil.

12. The lens driving device of claim 11, further comprising a flexible printed circuit board (FPCB) disposed between the substrate and the base,
wherein the FPCB comprises the terminal part.

13. The lens driving device of claim 11, further comprising a fifth conducting part connected with the first support member unit, and
a sixth conducting part connected with the second support member unit.

14. The lens driving device of claim 1, further comprising two sensors configured to detect x-axis and y-axis directional movements of the housing, respectively,
wherein the base comprises a sensor mounting part, and
wherein the two sensors are disposed in the sensor mounting part.

15. The lens driving device of claim 14, wherein the sensor mounting part is formed on a corner part of the base.

16. The lens driving device of claim 15, wherein the sensor mounting part comprises a shape corresponding with a shape of the sensor.

17. A lens driving device, comprising:
a base;
a housing disposed on the base;
a bobbin disposed in the housing;
a first coil disposed on the bobbin;
a magnet disposed on the housing;
a substrate disposed between the housing and the base, the substrate comprising a pattern coil facing the magnet, a first connection coil unit, and a second connection coil unit; and
a conducting member comprising only four conducting parts connected with the substrate,
wherein the pattern coil comprises first and second coil units opposite to each other, and third and fourth coil units opposite to each other,
wherein the first connection coil unit connects the first coil unit and the second coil unit, and
wherein the second connection coil unit connects the third coil unit and the fourth coil unit.

18. The lens driving device of claim 17, wherein the only four conducting parts comprise first to fourth conducting parts,
wherein the first conducting part is electrically connected to a first end of the first coil unit and a second end of the first coil unit is connected to a first end of the first connection coil unit, and
wherein the third conducting part is electrically connected to a first end of the third coil unit and a second end of the third coil unit is connected to a first end of the second connection coil unit.

19. The lens driving device of claim 18, wherein the second conducting part is electrically connected to a first end of the second coil unit and a second end of the second coil unit is connected to a second end of the first connection coil unit, and
wherein the fourth conducting part is electrically connected to a first end of the fourth coil unit and a second end of the fourth coil unit is connected to a second end of the second connection coil unit.

20. The lens driving device of claim 17, wherein the only four conducting parts of the conducting member comprises first to fourth conducting parts,
wherein the first conducting part is electrically connected with the first coil unit,
wherein the second conducting part is electrically connected with the second coil unit, wherein the third conducting part is electrically connected with the third coil unit, and wherein the fourth conducting part is electrically connected with the fourth coil unit.

* * * * *